United States Patent [19]

Rahrooh et al.

[11] Patent Number: 5,006,354
[45] Date of Patent: Apr. 9, 1991

[54] DEAERATION PROCESS FOR THE MANUFACTURE OF FRUIT JUICES

[76] Inventors: Ghobad Rahrooh, The Procter & Gamble Company - I.T.C., 5229 Spring Grove Ave., Cincinnati, Ohio 45217; Rüdiger A. Engel, Procter & Tamble GmbH, Sulzbacherstrasse 40, 6231 Schwalbach-am-Taunus, Fed. Rep. of Germany

[21] Appl. No.: 512,708

[22] Filed: Apr. 23, 1990

[30] Foreign Application Priority Data

Apr. 28, 1989 [GB] United Kingdom ................ 8909780

[51] Int. Cl.$^5$ ........................ A23L 2/00; G01N 33/00
[52] U.S. Cl. .................... 426/231; 426/487; 426/599
[58] Field of Search ............... 426/231, 487, 599, 311

[56] References Cited

U.S. PATENT DOCUMENTS

| | | | |
|---|---|---|---|
| 1,980,695 | 11/1934 | Polk | 426/487 |
| 4,259,360 | 3/1981 | Venetucci et al. | 426/487 |
| 4,737,367 | 4/1988 | Langer et al. | 426/599 |

FOREIGN PATENT DOCUMENTS

3221509-A 12/1983 Fed. Rep. of Germany .
2488785 2/1982 France .

*Primary Examiner*—George Yeung
*Attorney, Agent, or Firm*—Gary M. Sutter; Ronald L. Hemingway; Richard C. Witte

[57] ABSTRACT

The invention relates to a process for deaerating fruit juices during their manufacture, wherein vacuum deaeration is conducted on a concentrated source of the fruit juice, at a temperature such as to avoid damaging the volatile components of the fruit juice and separately deaerated water is subsequently added to the deaerated concentrated source.

15 Claims, No Drawings

DEAERATION PROCESS FOR THE MANUFACTURE OF FRUIT JUICES

TECHNICAL FIELD

This invention relates to a deaeration process to be applied to the manufacture of shelf-stable fruit juices.

BACKGROUND

Processes for sterilizing and deaerating fruit juices are well known; Sterilization is performed in order to eliminate problems linked to the development of microorganisms, and deaeration is aimed at reducing the level of dissolved oxygen in the fruit juice which is treated.

When manufacturing shelf-stable fruit juices, the reduction of the dissolved oxygen level is desirable in order to minimize the chemical oxidation processes that would otherwise develop in the fruit juice during the subsequent storage period, making it unfit for human consumption.

As disclosed in the European patent application EP 01 008 33-A, as well as in the French patent application FR 2 488 785-A, the known deaeration processes are carried out in vacuum conditions and are characterized by the elevated temperatures needed, i.e. above 50° C., in order to ensure a good efficiency in the process.

Although these processes allow to reach very low levels of dissolved oxygen in the deaereated fruit juices, they are not fully satisfactory; indeed, the use of high temperatures is prejudicial to an optimal conservation of the different volatile components of the treated fruit juice throughout the deaeration and, therefore, to the conservation of the aroma and taste of the fresh fruit juice.

It is an object of the present invention to provide an efficient deaeration process to be applied to the manufacture of shelf stable fruit juices, said process being performed at a temperature such as to avoid damaging the volatile components and vitamins of the treated fruit juice.

DETAILED DESCRIPTION OF THE INVENTION

Instead of vacuum deaerating single strength fruit juices at high temperature in a single process step, the deaeration process according to the invention is divided in two separate deaerations, performed
on a concentrated source of the fruit juice, on one hand, and
on water, on the other hand,
these two ingredients being subsequently mixed.

The deaeration of the water is carried out in order to obtain a dissolved oxygen level in the deaerated water of from 0 to 0.4 ppm.

Such deaeration can be carried out by heating water under atmosphere pressure, in which case very high temperatures are needed, i.e. temperatures around the boiling point of the water.

The dearation of water can also be carried out in vacuum conditions, preferably with a pressure of 0,1 bar; in this case, the temperature used in order to deaerate the water is in the range of from 50° C. to 60° C., and the residence time of the water in the vacuum chamber ranges from 1 min to 3 min, preferably 2 min.

On the contrary, the concentrated source of the fruit juice is to be deaerated under very smooth conditions, by heating at a temperature such as to avoid damaging the volatile components and vitamins. Preferably the deaeration of the concentrated source will be carried out at a temperature below 30° C., and more preferably in the range of from 0° C. to 5° C.

The deaeration of the concentrated source is also carried out in vacuum condition, preferably at 0,1 bar. This deaeration step allows to obtain deaerated concentrated sources having a dissolved oxygen level of less than 3 ppm.

The residence time of the concentrated source, in the vacuum chamber is not an essential feature, but is preferably in the range of from 3 min to 6 min.

In a particular embodiment of the invention, and in order to improve the deaeration efficiency, the concentrated source of fruit juice is preheated before being deaerated, preferably using heat exchangers; It is preferred in this case to provide immediate cooling after the dearation of the concentrated source of fruit juice in order to minimize exposure to elevated temperature; Heat exchangers are suitable for this cooling.

After the deaeration is completed, the two ingredients are mixed together. The dilution rate depends on the Brix of the concentrated source of the fruit juice.

Hence by mixing a concentrated source of fruit juice which has been deaerated at a temperature such as to avoid damaging the volatile components with thoroughly deaerated water, it is possible to obtain a fruit juice having a dissolved oxygen level which is compatible with a long storage time, said fruit juice still containing the volatile components of a fresh fruit juice. It is preferred to perform the process with a concentrated source of fruit juice having a high Brix value.

The resulting dissolved oxygen level in the finished product can be calculated as follows:

$$\frac{\text{Weight of water} \times \text{O}_2 \text{ level of water} + \text{weight of concentrated source} \times \text{O}_2 \text{ level of concentrated source}}{\text{Weight of finished product}}$$

Consequently, the dissolved oxygen level in the finished product depends on the efficiency of the deaeration process of the two ingredients and the dilution rate of the two separately deaerated ingredients.

The process described herein above can be performed continuously; in such case, the process will preferably comprise means to control that the two ingredients are mixed in convenient proportions; preferably, such control means consist of an in-line Brix-meter which measures the Brix of the finished product, and acts upstream as a regulating command on the system which feeds the deaerated water, before the mixing step.

It has been noticed that the concentrated source of fruit juice has a tendency to foam heavily during its deaeration; such foaming is prejudicial to a good efficiency of the process; Hence, in a preferred embodiment, the concentrated source of fruit juice is prevented from foaming by a foam breaking unit; for instance, the dearation vessel can be connected to a vacuum tank of slightly lower pressure, into which the foam is sucked via in line baffles, causing the foam to collapse; the resulting juice can be added back in line.

From the moment these two ingredients have been deaerated, it is highly desirable to avoid any oxygen intake; therefore, in a preferred embodiment of the invention, the deaerated water and the deaerated concentrated source of fruit juice are kept under an oxygen free atmosphere, more preferably, under nitrogen pressure, throughout the subsequent manufacture steps.

The taste and the aroma of the fruit juices obtained by the process according to the invention may be modified by a post-deaeration, in-line addition of commercially available volatile components and/or vitamins.

In order to avoid any oxygen intake, the addition of these components is preferably carried out in a closed system, under an inert gas pressure, preferably under nitrogen pressure.

EXAMPLE

The following example will illustrate the process according to the invention, but is not intended to limit the scope of the application.

A concentrated source of grapefruit juice of about 25° Brix is deaerated in a vacuum chamber, under a pressure of about 0.1 bar, at about 2° C., during about 3 minutes. The dissolved oxygen level before deaeration is about 10.6 ppm, and the dissolved oxygen level after dearation is about 3 ppm. Concurrently, water is deaerated in a vacuum chamber under a pressure of about 0.1 bar, at about 50° C., during about 2 minutes.

The dissolved oxygen level is about 8.5 ppm before deaeration and about 0.4 ppm after deaeration. The two ingredients are then mixed in order to obtain a grapefruit juice of about 10° Brix; the dissolved oxygen level in this final product is about 1 ppm.

What is claimed is:

1. A process for deaerating fruit juices during their manufacture, the process comprising: (a) conducting vacuum deaeration on a concentrated source of the fruit juice, at a temperature such as to avoid damaging the volatile components and vitamins of the concentrated fruit juice, wherein the dissolved oxygen level in the deaerated concentrated fruit juice is reduced to not more than 3 ppm, and then (b) subsequently adding separately deaerated water to the deaerated concentrated source, wherein the added deaerated water has a dissolved oxygen level of from 0 to 0.4 ppm.

2. A process according to claim 1 wherein the deaeration of the concentrated source of fruit juice is conducted at a temperature below 30° C.

3. A process according to claim 2 wherein the deaeration of the concentrated source is conducted at a temperature ranging from 0° C. to 5° C.

4. A process according to claim 2 wherein deaeration of the concentrated source is conducted during a time ranging from 3 to 6 min.

5. A process according to claim 1 which is performed continuously.

6. A process according to claim 5, characterized in that it comprises means to control that the deaerated concentrated source of fruit juice and the deaerated water are mixed in convenient proportions.

7. A process according to claim 6 wherein said control means consist of an in-line Brix meter which measures the Brix of the finished product and acts as a regulating command on the system which feeds the deaerated water, before the mixing step.

8. A process according to claim 1 wherein the concentrated source of fruit juice is preheated before being deaerated.

9. A process according to claim 8 wherein the foaming of the concentrated source of fruit juice is prevented.

10. A process according to claim 9 wherein the foaming of the concentrated source of fruit juice is prevented by means of a connection from the deaeration chamber to a tank of slightly lower pressure into which the foamed is sucked via in-line baffles.

11. A process according to claim 8 wherein volatile components are added in-line after the deaeration step.

12. A process according to claim 1 wherein the deaerated water, and the deaerated concentrated source of fruit juice are kept under an oxygen free atmosphere throughout the subsequent manufacture steps.

13. A process according to claim 6 wherein the deaerated water and the deaerated concentrated source of fruit juice are kept under nitrogen pressure.

14. A process according to claim 8 wherein vitamins are added in-line after the deaeration step.

15. A process according to claim 8 wherein both volatile components and vitamins are added in-line after the deaeration step.

* * * * *